Nov. 18, 1930.     J. E. JENSEN     1,782,204
FISHING LURE
Filed Oct. 10, 1929
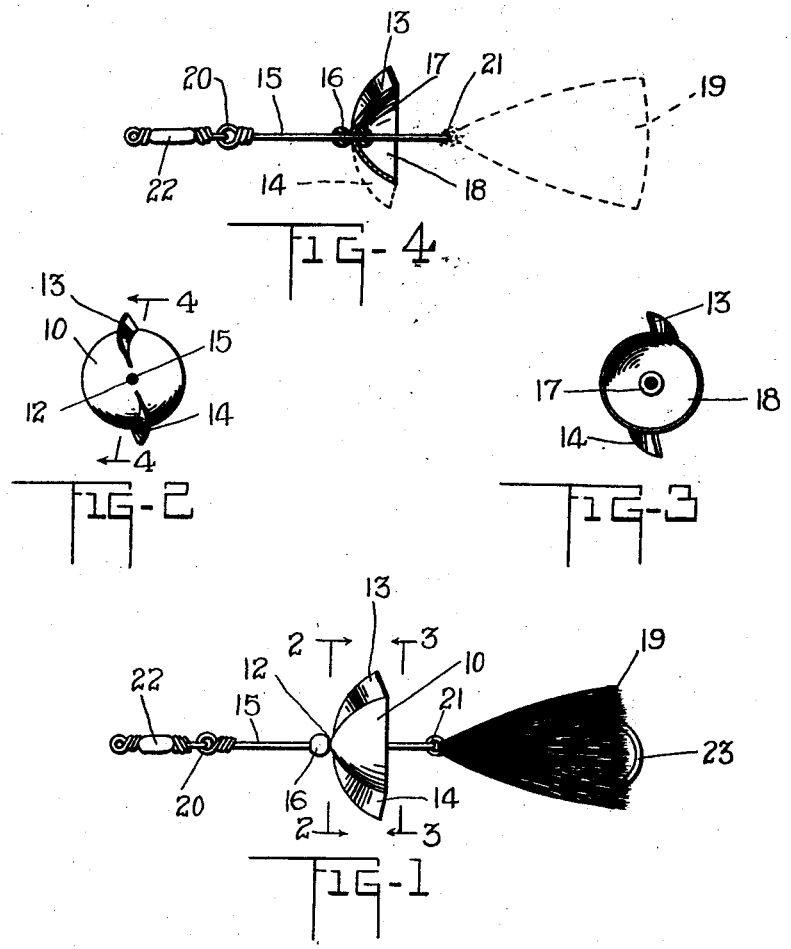

Patented Nov. 18, 1930

1,782,204

UNITED STATES PATENT OFFICE

JOHN EDWARD JENSEN, OF TORONTO, ONTARIO, CANADA, ASSIGNOR TO THE ALLCOCK-LAIGHT & WESTWOOD CO., OF TORONTO, CANADA

FISHING LURE

Application filed October 10, 1929. Serial No. 398,632.

The invention relates to a fishing lure as described in the present specification and illustrated in the accompanying drawings that form part of the same.

The invention consists essentially of the novel features of construction pointed out broadly and specifically in the claim for novelty following a description containing an explanation in detail of an acceptable form of the invention.

The objects of the invention are to facilitate the luring of the fish to the hook by giving a life like representation in the creation of bubbles and thereby attract the unwary fish to a tempting bait; to overcome the objections incident to spinners having flat disturbing surfaces liable to churn the water and only attract through flashes of brightness; to increase the pleasure of the angler and insure greater sport and a better catch and generally to provide a reliable and serviceable mechanical bait.

In the drawings, Figure 1 is a side elevation of the lure complete.

Figure 2 is a view taken on line 2—2 in Figure 1.

Figure 3 is a view taken on line 3—3 in Figure 1.

Figure 4 is a cross section taken on the line 4—4 in Figure 2.

Like numerals of reference indicate corresponding parts in the various figures.

Referring to the drawings, the numeral 10 indicates the spinner formed of a cup or bell having a hole 12 at its apex. Two spiral vanes or fins 13 and 14 are fixed on the outer surface of said spinner and consequently open the cup or bell on a draw wire 15. The wire 15 extends through the hole 12 and rotates between the ball stops 16 and 17, said cup or bell having its mouth 18 facing the tail 19 which forms a trail at the end of the draw wire 15.

The draw wire 15 is looped at either end to form the eyes 20 and 21; the eye 20 carrying the swivel eye 22 for attaching the lure to the line while the loop 21 is attached to the detachable tail assembly 19 hiding the hook 23.

In the operation of this invention the lure is attached to the line, and on being cast and drawn through the water the hollow spinner 10 rotates causing a partial vacuum behind it and traps the air which leaves the back of the spinner in the form of bubbles.

The tail portion 19 travelling in these bubbles provides a very effective lure.

This invention must not be confused with the ordinary flat form of spinner as in this type the water is only disturbed and causes an eddy in its wake, while this invention creates a distinct bubbling wake.

What I claim is:—

A fishing lure, comprising a draw wire terminating in a suitable tail, a spinner freely mounted on said wire intermediate of the length thereof between ball members and having a bell mouth facing said tail and spiral fixed fins projecting from the outer surface of said spinner and rotating it to produce air bubbles in the wake through which said tail trails.

Signed at Toronto, Canada, this 7th day of September, 1929.

JOHN EDWARD JENSEN.